United States Patent [19]
Berry

[11] 3,861,846
[45] Jan. 21, 1975

[54] MOULDS FOR MANUFACTURING THROUGH EXTRUSION-BLOWING OF SEALED CONTAINERS MADE FROM PLASTICS MATERIAL

[75] Inventor: Jean-Luc Berry, Mesnil sur L'Estree, France

[73] Assignee: E. P. Remy et Cie, Dreux, France

[22] Filed: Sept. 20, 1973

[21] Appl. No.: 399,355

[30] Foreign Application Priority Data
Sept. 21, 9172 France .......................... 72.33520
Aug. 10, 1973 France ............................ 73.29427

[52] U.S. Cl. ................. 425/305 B, 425/DIG. 212, 425/DIG. 233
[51] Int. Cl. ............................................ B29c 17/14
[58] Field of Search ......... 425/326 B, 302 B, 305 B, 425/311, 203, 212, 387, DIG. 25, 405; 264/94, 98, 99

[56] References Cited
UNITED STATES PATENTS
| | | | |
|---|---|---|---|
| 3,473,192 | 10/1969 | Martelli | 264/99 X |
| 3,690,803 | 9/1972 | Pechtold et al. | 425/326 B |
| 3,699,201 | 10/1972 | Turner | 264/98 |
| 3,793,422 | 2/1974 | Johnston | 264/99 |

Primary Examiner—Andrew R. Juhasz
Assistant Examiner—W. R. Briggs
Attorney, Agent, or Firm—Kenyon & Kenyon Reilly Carr & Chapin

[57] ABSTRACT

The invention concerns a mould for the manufacturing through extrusion-blowing of plastic sealed containers. This mould includes grooves which surround a channel forming the upper end of the container so as to provide a vacuum around the parison adjacent to closing and separating means which provide in said channel a sealed area.

17 Claims, 6 Drawing Figures

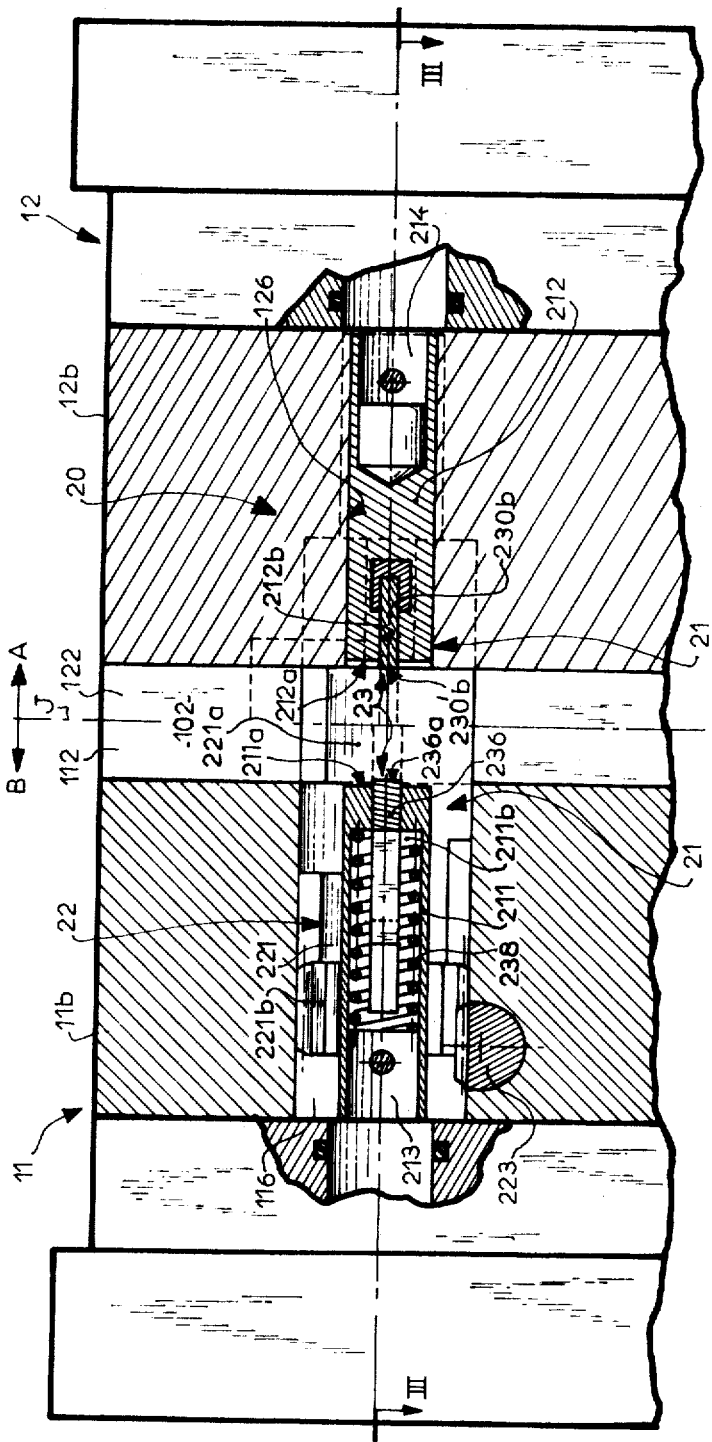

MOULDS FOR MANUFACTURING THROUGH EXTRUSION-BLOWING OF SEALED CONTAINERS MADE FROM PLASTICS MATERIAL

The present invention relates essentially to a mould for the manufacturing through extrusion-blowing or the like of tightly closed or sealed containers, tanks or like holding vessels or hollow wares or products made from a heat-sealable plastics material extruded as a continuous tubular parison closed at its lower portion and kept under a given inner pressure. The mould involved is a mould of the kind comprising a pair of shells separable and juxtaposable along a joint face or parting line and exhibiting a pair of complementary impressions or cavities of a shape corresponding to that of the container to be made and a pair of also complementary grooves or notches forming together a channel opening at the upper portion of the mould when the latter is closed and communicating with said impressions or cavities. Said shells when separated are provided for admitting therebetween the extruded parison and when juxtaposed for enclosing said parison in part between the impressions and in part within said channel and the shells are provided with means to produce about at least the greatest portion of the parison an outer pressure which upon inflating the container will be lower than said inner pressure applying the parison against the impressions or cavities and giving it the shape of the container and with closing and separating means provided in the channel area for tightly closing the container at its top portion and the next or following parison at its bottom portion and for separating said container from said next or following parison.

The co-pending U.S. patent application Ser. No. 222,896 filed on Feb. 2, 1972, now U.S. Pat. No. 3,814,783 under the title: "Method of manufacturing containers and device for the carrying out of said method" in the name of the applicant discloses in a detailed manner a method of extruding-blowing such as referred to hereinabove and more briefly a device for using this method, the device comprising in particular a mould associated with an extruding nozzle which delivers the parison.

Experiments or tests carried out when practising this method have shown that a frequently encountered difficulty was the flattening of that portion of the parison which is located within the channel in the vicinity of the position where the closing of the container and of the following parison has to be done, i.e., adjacent to said closing and separating means, this flattening having the effect of preventing the blowing, inflating or expanding from taking place normally.

A means for avoiding this drawback is to provide a vacuum about the wall located within the channel but experience has shown that in such a case if some precautions are not taken, the parison is distorted and enters all of the interstices having a width above a few tenths of millimeters thereby causing its local bursting or shivering and its adherence when being stripped.

Experience has shown at last that cutting or severing of the finished container and its separation from the following parison should be effected on an at least partially cooled material for being done under satisfactory conditions.

An object of the mould according to the present invention is to avoid the above-mentioned inconveniences and to reach the goal mentioned hereinbefore and it is characterized in that said closing and separating means are provided to form within said channel a fluid-tight area sealed off with respect to the plastics material. Means are moreover provided for producing, in the vicinity of said means for closing and separating the parison, an outer pressure substantially equal to that which has been built up over said greatest portion of the outer surface of the parison.

According to an advantageous embodiment for using these moulds, a constant inner pressure, which is nothing else than that of the supply or source of sterile gas used, is applied inside of the parison which is adapted to form the container and throughout the process of formation of this container. To achieve the inflation or blowing up of the containers, an evacuation of the mould is then used, i.e., an application to the greatest part of at least the outer surface of the parison, of an outer pressure which, when inflating or blowing up the container, is definitely lower than the inner sterile gas pressure used and which is desirably lower than the atmospheric pressure.

Thus the vacuum producing means, since they surround the channel, prevent the flattening of the neck portion within the region where the closing has to be done whereas the configuration of said closing and separating means, which are fluid-tight or sealed off with respect to the plastics material, prevents any distortion of the parison when it is applied against the walls of the channel through the action of said vacuum generating means. Finally the application of the plastics material onto the walls of the channel has the effect of accelerating its cooling hence facilitating the cutting or severing.

Although this method of using a mould according to the invention is usually more convenient, it is obvious that in some cases it may be advantageous to achieve the inflation or blowing up of the container through the application of an inner overpressure without any application of an outer vacuum or like underpressure or with the application of a reduced outer vacuum or underpressure.

In any case, it is only required to achieve the inflation of the containers to provide at some time at least of the production cycle for the containers, when a parison has been positioned within the mould, a pressure differential between the inner pressure applied to the inside of the parison and the outer pressure applied to the outside of the parison, which should be high enough to achieve the deformation of the parison and its shaping into a container by being laid onto or urged against the wall of the mould.

According to a further characterizing feature of the invention, the aforesaid closing and separating means comprise, in combination, means for clamping or nipping that portion of the parison which lies within said channel, retractable obturating means located on either side of the clamping or pinching means and provided, when they are in an active or operative position, to define together with said clamping or nipping means, said fluid-tight area, and cutting or severing means provided for running through said fluid-tight area after the clamping means have locally pinched or nipped and welded or sealed said portion of the parison and for cutting off or severing said portion at the region thus sealed.

According to another characterizing feature of the invention, said clamping means consist of a pair of gripping jaws, clamps or like nippers mounted in confronting relation to each other on each one of the shells and movable according to a translatory motion with respect to said shells along a direction extending at right angles to the axis or centre line of said channel and of a pair of driving members connected to each one thereof and provided for moving same between a retracted or inoperative position wherein the front edge or flange of each jaw is substantially in aligned or registering relationship with the wall of the channel and an extended or operative position wherein said jaws move into said channel until the front edge or flange of one of them bears against the forward edge or flange of the other one through the medium of the parison.

Still according to the invention, one of said jaws carries the cutting means which consist of a blade mounted for sliding motion on the one hand along a direction extending at right angles to the travel of the jaws and on the other hand along a direction parallel with said travel.

Further characterizing features and advantages of the invention will appear as the following descriptive specification proceeds.

In the accompanying drawings given by way of example only:

FIG. 2 is a view, at a larger scale, of the upper portion of the mould according to FIG. 1, shown in a less diagrammatic manner, the parison having been omitted for the sake of simplicity;

Figure 1:
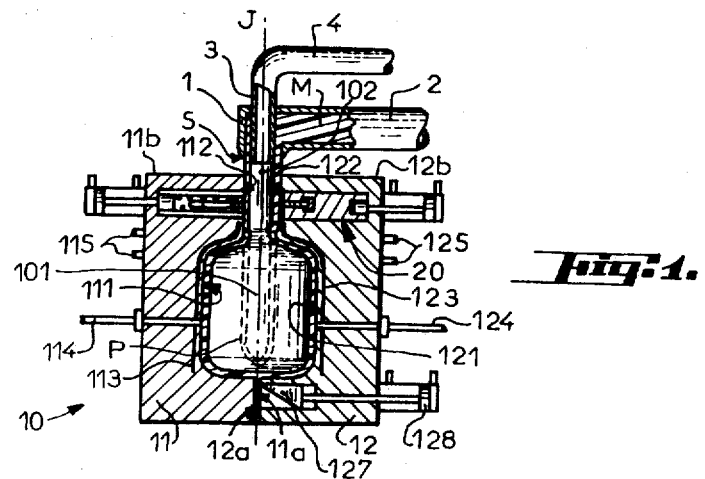
FIG. 1 shows a cross-sectional view of a mould according to the invention associated with an extrusion die or nozzle, the mould being illustrated diagrammatically.

In FIG. 1 has been shown diagrammatically a die 1 of circular cross-section connected by means of a pipe 2 to an extruder (not shown) which delivers or feeds thereto a molten or fused heat-sealable plastics material M such as polyethylene for instance. The die 1 is formed inside with a central concentric duct or passageway 3 also of circular cross-section, connected through a pipe 4 to a supply or source of sterile gas desirably maintained at a constant pressure and not shown, which gas may consist of an inert gas such as previously sterilized nitrogen kept at a pressure slightly above atmospheric pressure, for instance at about from 0.04 to 0.06 atmosphere, which is a usual pressure value for sterile gas at which it is desired that the containers made be delivered at the outlet of the mould. The plastics material is extruded through the ring shaped orifice 5 defined by the lower edge of the die 1 and by the lower edge of the central duct 3, so that it forms at the outlet of the die 1 a parison P exhibiting a tubular shape as shown in dotted lines in FIG. 1.

Below the die 1 is placed a mould according to a preferred form of embodiment of the invention which is denoted generally by the reference numeral 10. The mould 10 consists of a pair of shells 11 and 12 movable with respect to each other through a relative translatory motion along a horizontal direction, i.e., a direction extending at right angles to the parison P which hangs vertically from the nozzle 1, these shells being adapted for this purpose to be mounted on slide-ways and to be connected to a control actuator or driving ram. Both shells 11 and 12 may be separated from each other so as to accommodate therebetween the tubualr parison P or juxtaposed with their mutually confronting flat faces 11a and 12a which are then located within a same vertical joint face or parting line J, said shells then enclosing or confining the parison P therebetween. Both shells 11 and 12 are formed with a pair of complementary hollow impressions or cavities 111 and 121, respectively, the shape of which corresponds to that of the container to be achieved and with a pair of also complementary notches, grooves or the like 112 and 122, respectively, between each one of the impressions 111 and 121 and the top edge 11b and 12b, respectively, of each shell. When the mould is closed, that is when both shells 11 and 12 are juxtaposed with their faces 11a and 12a positioned in the vertical joint plane or parting line J, both impressions 111 and 121 form together the inner cavity 101 which encloses that portion of the parison P which is adapted to form the body of the container whereas the grooves or slots 112 and 122 form together a channel 102 which opens at the top portion of the mould and communicates with said inner cavity 101, the channel enclosing or confining that portion of the parison P which is adapted to form the neck or spout of the container.

Figure 4:
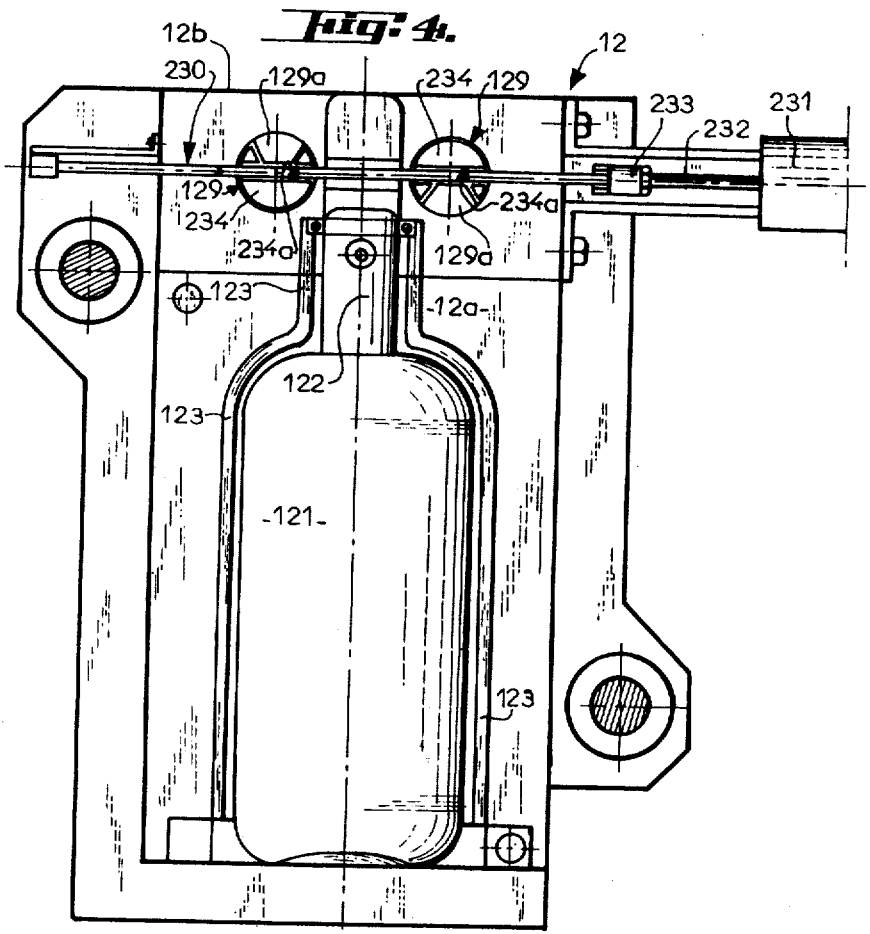
FIG. 4 shows the right-hand shell of FIG. 2 seen in the direction of the arrow A of said Figure.
Figure 3:
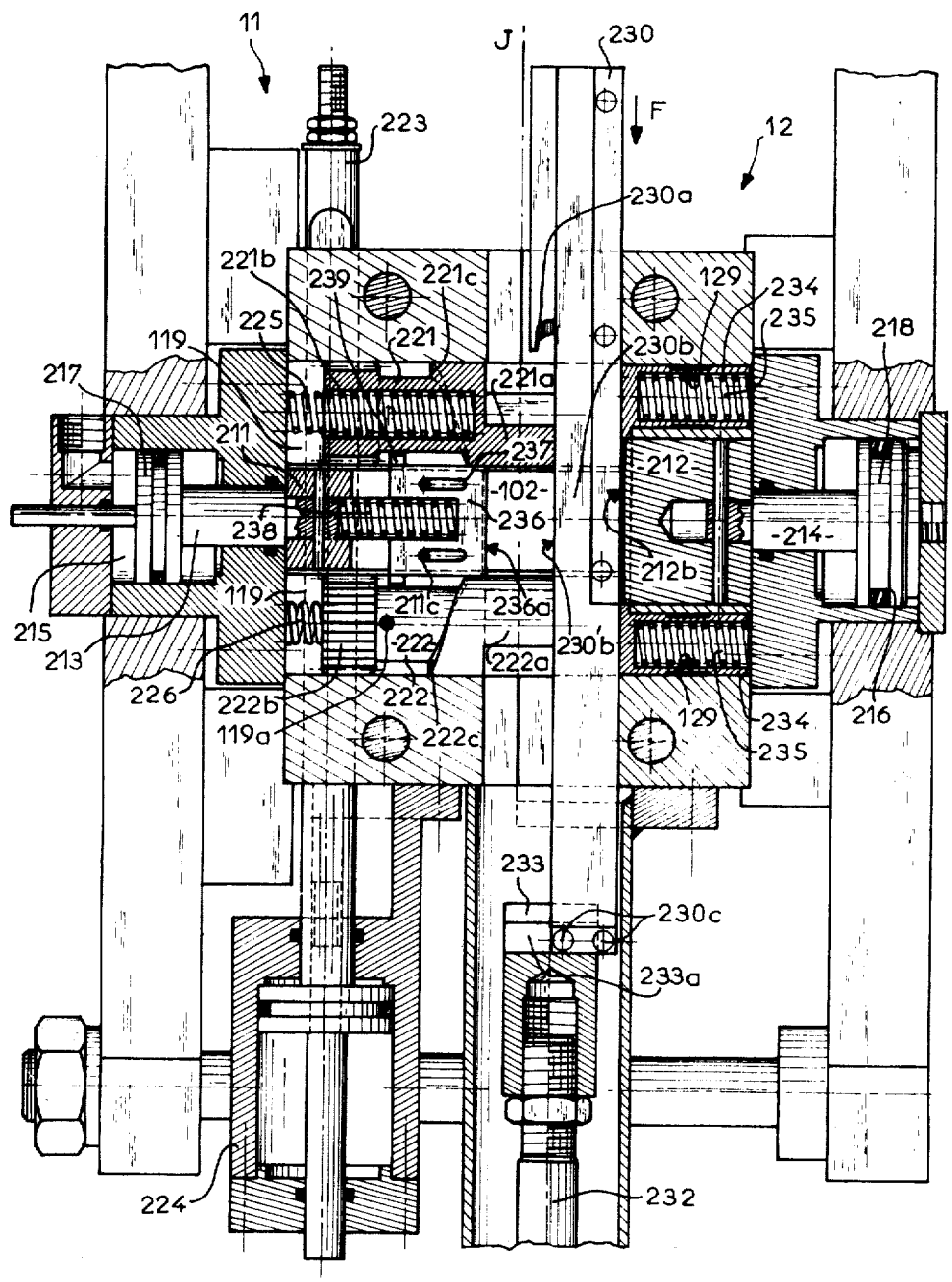
FIG. 3 is a cross-section taken upon the line III—III of FIG. 2.
Figure 5:
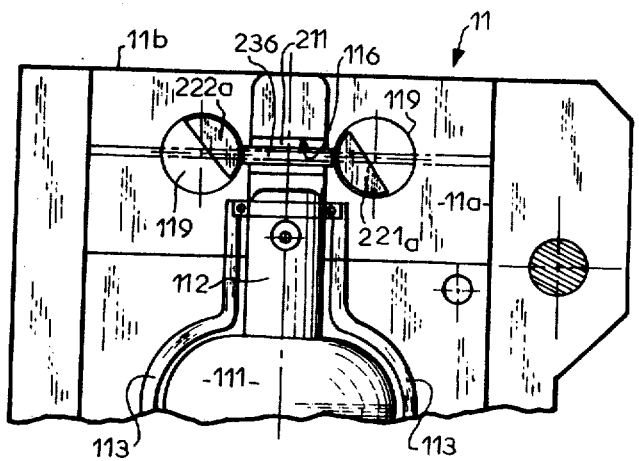
FIGS. 5 and 6 are partial views of the left-hand shell of FIG. 2 seen in the direction of arrow B of said Figure and showing both possible positions of the obturating means.

Each one of the shells 11 and 12 is moreover formed with grooves 113 and 123, respectively, cut into its joint face or parting line plane 11a and 12a and positioned along the recess 111 and 121 and along the bottom portion of the groove 112 and 122, respectively, (see FIGS. 4, 5 and 6), each one of these grooves communicating with ducts such as 114 and 124, respectively, connected to a vacuum source (not shown), so as to allow, between the closed mould and the parison confined within said mould, the building up of a vacuum which applies said parison against the walls of the inner cavity 101 and channel 102, thus giving said parison the shape of the container when as assumed in the present example, the inner pressure for inflating the containers is constant and about atmospheric pressure. The fact that the grooves 113 and 123 are also provided at the lower portion of the channel 102 has the effect that not only the portion of the parison forming the body of the container but also the portion of this parison forming the neck or spout of the container are subjected to a vacuum or underpressure.

At 115 and 125 have been shown the ingress and egress ducts of a cooling circuit and at 127 has been shown a degating guillotine or like shearing device or cutter slidably mounted at the lower portion of the shell 12 and connected to a driving appliance such as a pneumatic actuator or ram 128.

The mould 10 is finally provided at its upper portion within the area of the channel 102 and within that portion of this channel which is lying right above the vacuum grooves 113 and 123, with closing and separating means generally denoted by the reference numeral 20. These means, the function of which is on the one hand to tightly close or seal the container at its upper portion and the following parison at its lower portion and on the other hand to separate said container from said following parison, will be described hereinafter in a detailed manner.

With reference to FIGS. 2 to 6 and in particular to FIG. 2, it is seen that the closing and separating means 20 essentially comprise clamping and sealing or welding means 21 for nipping or clamping and sealing that portion of the parison P which is within the channel 102, retractable shutting means 22 which are positioned on either side of said clamping and sealing means 21 and which co-operate with the latter to define, within the channel 102, a fluid-tight area sealed off with respect to the plastics material, i.e., devoid of any interstices which the parison could enter when it is subjected to the action of the vacuum and cutting or severing means 23 provided to cut off the material within said area so as to separate the container formed within the mould from the remainder of the parison exiting from the die 1.

The clamping and sealing means 21 comprise a pair of jaws or clamps 211 and 212, slidably mounted within a pair of recesses or the like 116 and 126, respectively, of the shells 11 and 12. These jaws 211 and 212 are movable according to a translatory motion with respect to said shells along a direction extending at right angles to the joint face or plane of the parting line and are connected by means of rods 213 and 214 to operating ram-like actuators 215 and 216, respectively, which are able to move them between a retracted or inoperative position for which the front edge or flange of each jaw 211a and 212a, respectively, is substantially in aligned or registering relationship with the wall of the channel 102 (this position being that shown in FIGS. 2 and 3) and a clamping or operative position in which said jaws while moving into the channel 102 push back the parison partially cooled through its contact with the channel walls but remaining however at a temperature high enough for being able to be sealed until they are caused to bear against each other through the medium of said parison thus clamped or nipped therebetween. The actuators 215 and 216 are double acting hydraulic or pneumatic rams enabling to drive the jaws in either direction, the piston 218 of the actuator 216 having a larger sectional area than the piston 217 of actuator 215. The jaw 212, thus subjected to a larger force than the jaw 211, therefore offers a reliable support or bearing to the latter, thereby providing the advantage that the clamping plane of the parison is accurately determined.

Within the recesses 119 of the shell 11, located on either side of the recess 116 of the jaw 211, are mounted the obturating means which consist of a pair of like parts 221 and 222 of general cylindrical shape mounted so as to be able on the one hand to slide in one direction extending at right angles to the joint face or plane of the parting line J, i.e., in parallel relation to the sliding direction of the jaws 211 and 212 and on the other hand to rotate about their axis of revolution. The obturators 221 and 222 are formed at their lower portions, that is on the side of the joint face J of the mould, with projections 221a and 222a, respectively, in the shape of segments of a circle having an opening slightly smaller than 180° as seen in particular in FIGS. 5 and 6. The obturating members 221 and 222 are provided at their rear or back portion, i.e., opposite from the segments 221a 222a, with gears 221b and 222b, respectively, which are meshing with a sliding rack 223 connected to a double acting hydraulic or pneumatic ram-like actuator 224 which moves same back and forth according to a reciprocating motion in perpendicular relation to the direction of displacement of the jaws 211 and 212 hence in parallel relation to the joint face J, so that the translatory motion of said rack causes the rotation of the obturating members 221 and 222 about their respective centre lines or axes within the recesses 119. Each obturating member 221 and 222 also comprises in its central portion a helical ramp 221c and 222c the function of which will be set forth hereinafter. Finally the obturating members 221 and 222 are provided each one with a return or biasing spring 225 and 226, respectively, which urge them towards the joint face J so that they are normally bearing against stationary cotter pins 119a (one of which only is visible in FIG. 3), their ends in the shape of segments 221a and 222a projecting into the channel 102 of the mould. The sizes of said ends in the shape of segments 221a and 222a are such that in the position shown in FIG. 5, they are flush with the side edges or flanges of the jaw 211. Furthermore when the jaw 211 is moved away from the joint face J by its actuator 215, the actuator 224 moves through the medium of the rack 223 the obturating members 221 and 222 into the angular position shown in FIG. 6, that is a position for which their two ends in the shape of mould segments 221a and 222a have their flat faces 221'a and 222'a in parallel relation to each other so as to enable the passage of the cutting or severing means as will be explained hereinafter.

The cutting means 23 essentially comprise a blade 230 carried by the jaw 212 and a counter-blade or backing blade 236 carried by the jaw 211 and positioned in front of said blade. The blade 230 comprises a sharp knife edge 230a and a heel portion 230b which is slidably mounted in a notch or like slot 212b of the jaw 212, the forward edge 230'b of said heel portion being substantially flush with the front edge 212a of the jaw 212. The blade 230 is provided so as it may slide with respect to the jaw 212 both along a direction parallel with the joint face J and along a direction perpendicular to this joint face, that is in parallel relation to the direction of travel of the jaws. The displacement of the blade in parallel relation to the joint face is effected by a hydraulic or pneumatic actuator 231 (see FIG. 4) the rod 232 of which is provided at its end with a yoke or like strap 233 comprising a groove 233a extending at right angles to the rod 232 and which is engaged by snugs 230c secured to the end of the heel 230b of the blade 230 and which are able to slide within said groove so as to allow a motion in perpendicular relation to the joint face of the blade 230. A pair of ejectors 234 slidably mounted within recesses 129 located on either side of the recess 126 for the jaw 212 and capable of moving in perpendicular relation to the joint face J through the action of release or biasing springs 235 are bearing upon or engage the heel 230b of the blade. The ejectors 234 are provided at their ends with a diametral slot 234a enabling the free passage of the blade (see FIG. 4) which keeps them in their respective recesses.

The counter-blade 236 is mounted within a notch or the like 211b of the jaw 211 so as to be able to slide with respect to the latter at right angles to the joint face. The counter-blade 236 has a pair of elongated guide openings 237 through which extend stud pins 211c fast with the jaw 211 and it is subjected to the action of a release or return spring 238 which forces it back towards the joint face J to a position wherein its front edge 236a is flush with the forward edge 211a of the jaw 211. The counter-blade 236 is in addition provided, adjacent to its rear or back edge, with a pair of shoulders or the like 239 co-operating with helical ramps 221c and 222c of the obturators 221 and 222, these helical ramps having the function of moving the counter-blade 236 away from the joint face against the action of the spring 238 so as to clear the groove 211b and therefore to allow the passage of the cutting edge 230a of the blade 230. The helical ramps 221c and 222c are provided for moving the counter-blade 236 towards the position furthest to the left when looking at FIG. 3, that is towards a retracted position when the obturating members assume the angular position shown in FIG. 5 which corresponds to the free passage of the blade 230.

On the face 12a of the shell 12 in the vicinity of the recesses 129 in which are mounted the sliding ejectors 234, there are provided stationary stops 129a serving to angularly position the obturating members 221 and 222 as will be explained hereinafter.

The operation of the closing and separating means described hereinabove is the following:

In the starting position the mould 10 is placed in open configuration below the die 1, i.e., both of its shells 11 and 12 are separated from each other and located in symmetrical relation to the axis or centre line of said die; the plastics material moves out from the die in the shape of a tubular parison P. The obturators 221 and 222, subjected to the action of their release or biasing springs 225 and 226 which push them back towards the joint face, are bearing upon the pins 116a and 117a, so that their forward portions 221a and 222a are projecting with respect to the plane 11a of the shell 11. Moreover these portions 221a and 222a assume the angular position shown in FIG. 5. The jaws 211 and 212 are in a retracted position, i.e., their forward edges 211a and 212a are in alignment with the walls of the grooves 112 and 122. The blade 230 and the ejectors 234 are in the retracted position shown in FIG. 3. The counter-blade 236 is biased by its release spring 238 towards the joint face so that its front edge 236a is flush with the forward edge 211a of the jaw 211.

When the parison P has attained a sufficient length, the closing of the mould is effected by drawing both shells 11 and 12 towards each other to a juxtaposed or meeting position. The lower portion of the parison is clamped between both bottom edges of the shells (see FIG. 1) whereas the top portion of the parison extends through the channel 102 which exhibits in at least the region of the closing and separating means 20 that is at the location where the clamping should take place an area of substantially rectangular or square cross-section defined on the one hand by the front portions 221a and 222a of the obturators 221 and 222 and on the other hand by the forward edges 221a and 212a of the jaws 211 and 212, the forward edges 236a of the counter-blade 236 and the front edge of the heel 230b of the blade 230 being flush with said forward edges 211a and 212a.

The parison is then caused to be inflated by providing vacuum between the latter and the mould, the inflating or blowing gas being fed at the same time through the central duct 3 of the die.

After a few moments of contact between the mould and the parison for cooling the latter, the actuators 215 and 216 drive the jaws 211 and 212 simultaneously towards the joint face so as to clamp the parison therebetween. During this operating step the obturators are forced partially back through the action of the forward edge of the heel 230b of the blade 230 whereas the ejectors 234 are advancing towards the joint face by a corresponding distance.

Figure 6:
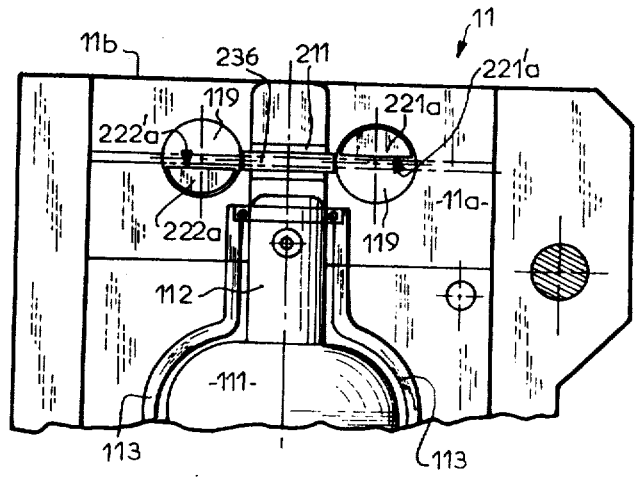

The actuator 224 then operates the rack 223 which rotates the obturators 221 and 222 until their front portions in the shape of segments 221a and 222a are coming into engagement with the stops 129a, said portions 221a and 222b then assuming the position shown in FIG. 6 in which the passageway for the blade 230 is entirely cleared. The rotation of the obturators 221 and 222 also causes the counter-blade 236 to be retracted or moved backwards by the action of the helical ramps 221c and 222c on the fingers or shoulders 239 of said counter-blade 236, this against the action of the release spring 238, so that the counter-blade frees or clears the/passageway for the cutting edge 230a of the blade 230.

The actuator 231 then moves the blade 230 in the direction of the arrow F, the edge 230a of said blade, upon moving past, severs the plastics material clamped and sealed between both jaws 211 and 212 thus separating the tightly closed or sealed container at the top portion of its neck or spout and the base of the following parison also tightly closed at its bottom portion.

The backward travel of the blade, the obturators and the jaws to their starting position for a new working cycle as well as the opening of the mould are controlled by the corresponding actuators according to a sequence which may for instance be the following: backward motion of the blade, backward motion of the obturators, then opening of the mould and finally opening of the jaws. The following sequence may also be adopted: opening of the jaws, backward motion of the blade, closing again of the jaws, backward motion of the obturators, opening of the mould and finally re-opening of the jaws.

It is apparent that the device according to the invention enables to carry out the clamping of the parison within the region of the neck while this parison undergoes a vacuum (outer pressure below atmospheric pressure) which applies it against the walls of the channel so that it does not incur any risk of undergoing a flattening likely to prevent a normal inflation or blowing of the container. Moreover the tightly sealed configuration of the area in which the clamping is effected removes any risk of distortion of the parison.

Many alternative modifications could be applied to the form of embodiment described and shown yet without being outside of the scope of the invention. Thus the means for operating the blade, the jaws and the obturating members could consist of electromagnetic elements instead of consisting of hydraulic or pneumatic ram-like actuators as shown.

It should be understood that the invention is not at all limited to the forms of embodiment described and shown which have been given by way of example only. In particular it comprises all the means forming technical equivalents to the means described as well as their combinations if the latter are carried out according to the gist of the invention and used within the scope of the appended claims.

What is claimed is:

1. A mould for blow-moulding sealed containers kept under an inner pressure and obtained from a heat-sealable plastic material extruded as a continuous tubular parison closed at its bottom portion, comprising a pair of separable shells that are juxtaposable along a joint face and exhibiting a pair of complementary depressions with a shape corresponding to that of the container to be made and a pair of also complementary notches or grooves forming together a channel opening at the top portion of the mould when the latter is closed and communicating with said depressions, said shells being adapted when they are separated to accommodate the extruded parison therebetween and when they are juxtaposed to enclose or confine said parison in part between the depressions and in part within said channel, said shells being provided with means for generating about at least the major portion of the parison an outer pressure which when inflating the container will be lower than said inner pressure urging said parison against said depressions of the mould and giving it the shape of the container and closing and separating means provided in the channel area to tightly close the container at its upper portion and the following parison at its lower portion and to separate said container from said following parison, said closing and separating means being adapted to provide within said channel a fluid-tight area sealed off with respect to the plastic material and comprising in combination means for clamping that portion of the parison which is located within the channel, retractable obturating means located on each side of the clamping means and adapted when they are in operative position to define together with said clamping means said fluid-tight area and cutting means adapted to extend through said fluid-tight area after said clamping means have locally nipped or clamped and sealed said portion of the parison and after retraction of said obturating means to cut or sever said portion at the location thus sealed.

2. A mould according to claim 1, wherein said clamping means consist of a pair of jaws or clamps mounted in confronting relation to each other on each one of the shells and movable according to a translatory motion with respect to said shells in a direction extending at right angles to the joint face and of a pair of driving members connected to each one thereof and adapted to move same between a retracted or inoperative position in which the front edge of each jaw is substantially in alignment with the channel wall and an extended or operative position in which said jaws move into said channel until the forward edge or flange of one of them bears against or comes into engagement with the front edge or flange of the other one through the medium of the parison.

3. A mould according to claim 2, wherein said driving means are adapted to apply both of their jaws with different forces so that one of the jaws forms a reliable support or backing for the other jaw.

4. A mould according to claim 3, wherein said driving members consist of double acting ram-like actuators having differing cross-sectional areas.

5. A mould according to claim 2, wherein one of the jaws carries said cutting means which consist of a blade mounted for sliding motion on the one hand in a direction perpendicular to the travel of the jaws and on the other hand in a direction parallel with said travel.

6. A mould according to claim 5, wherein said blade comprises means for driving it according to a translatory motion in a direction perpendicular to the displacement of the jaws and return or biasing means which push it back towards the joint face.

7. A mould according to claim 6, wherein the means for driving in a direction perpendicular to the travel of the jaws consist of a double acting ram-like actuator which imparts a back-and-forth or reciprocating motion to the blade.

8. A mould according to claim 5, wherein the other jaw carries a counter-blade located in front of said blade and mounted for sliding motion with respect to said jaw in a direction of translatory motion parallel with the travel of the jaws.

9. A mould according to claim 8, wherein said counter-blade is connected to driving means enabling to drive in according to a translatory motion between an extended position in which its front edge or flange is substantially flush with the forward edge or flange of the corresponding jaw and a retracted position in which it moves into said jaw so as to allow the passage of said blade when the latter is driven by said actuator.

10. A mould according to claim 5, wherein said blade and counter-blade are kept substantially flush with the front edges of their respective jaws during the operating step for clamping and sealing the parison.

11. A mould according to claim 1, wherein said obturating means are arranged on the shell carrying the jaw provided with the counter-blade on either side of said jaw and consist of parts adapted to slide with respect to said shell in a direction parallel with the travel of the jaws and capable of effecting a rotating motion about an axis also parallel to the direction of displacement of the jaws.

12. A mould according to claim 11, wherein said obturators consist of parts of general cylindrical form provided with a forward portion in the shape of a segment which is projecting with respect to the joint face of the shell and which is flush with the side edges of said counter-blade, said parts being provided with a toothed gear at their opposite ends.

13. A mould according to claim 12, wherein said cylindrical parts are provided with a driving member for translatory motion, consisting of a release spring tending to drive same towards the opposite shell and of a driving member for rotation consisting of a slidably mounted rack meshing with said gears, said rack being connected to an actuator which drives it back-and-forth according to a translatory reciprocating motion.

14. A mould according to claim 8, wherein the means for displacing said counter-blade back-and-forth according to a reciprocating motion in parallel relation to the travel of the jaws consist on the one hand of a biasing spring which pushes it back towards said extended position and on the other hand of helical ramps provided on said cylindrical parts and which are engaged by snugs fast with said counter-blade, the rotation of said parts bringing the counter-blade into a retracted position.

15. A mould according to claim 14, wherein said driving member for rotating said cylindrical parts is adapted to move the counter-blade to the retracted position and at the same time to move said segment-shaped ends into alignment with each other so as to allow the passage of the cutting blade when the latter is driven by its operating actuator.

16. A mould according to claim 1, wherein means are provided for generating in the vicinity of said means for closing and separating the parison an outer pressure substantially equal to that which is built up over said major portion of the outer surface of the parison.

17. A mould according to claim 16, wherein said means consist of channels causing the inner space of the mould subjected to said outer pressure to communicate with one portion of said channel in which is formed the neck of the container, which portion is located between said closing and separating means and the lower portion of the mould.

* * * * *